(12) United States Patent
Votipka

(10) Patent No.: US 6,185,589 B1
(45) Date of Patent: Feb. 6, 2001

(54) AUTOMATIC BANNER RESIZING FOR VARIABLE-WIDTH WEB PAGES USING VARIABLE WIDTH CELLS OF HTML TABLE

(75) Inventor: Bruce Votipka, Fort Collins, CO (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/127,185

(22) Filed: Jul. 31, 1998

(51) Int. Cl.[7] .................................................. G06F 17/25
(52) U.S. Cl. ........................ 707/517; 707/501; 707/513; 345/342
(58) Field of Search .................................... 707/517, 501, 707/513, 526, 504; 345/335, 338, 341, 342, 347, 348

(56) References Cited

U.S. PATENT DOCUMENTS

| | | | | |
|---|---|---|---|---|
| 5,687,331 | * | 11/1997 | Volk et al. ............................ | 345/327 |
| 5,845,299 | * | 12/1998 | Arora et al. .......................... | 707/513 |
| 6,025,841 | * | 2/2000 | Finkelstein et al. ................. | 345/342 |
| 6,052,130 | * | 4/2000 | Bardon et al. ....................... | 345/439 |
| 6,057,842 | * | 5/2000 | Knowlton et al. ................... | 345/348 |

OTHER PUBLICATIONS

*Laura Lemay's Web Workshop: Designing With Stylesheets, Tables, and Frames*, Sam.net Publishing, 1997, pp. 94–117.*

* cited by examiner

*Primary Examiner*—Stephen S. Hong

(57) ABSTRACT

Web page banners are constructed in parts using HTML tables rather than as a single graphical image to allow web page designers to reuse the banner for different window widths without requiring a separate banner for each width. The background image is defined in an HTML table. Each graphical image that in the prior art would normally be embedded within the single GIF image is separately overlaid, with a transparent background to allow the table background to remain visible, in a separate fixed-width cell of the table. Empty space regions are defined as transparent variable-width cells and appropriately positioned in the table. The user's browser automatically resizes the variable-width cells to adjust the width of the table to cover the width of the window that displays the web page.

15 Claims, 4 Drawing Sheets

AUTOMATIC BANNER RESIZING FOR VARIABLE-WIDTH WEB PAGES USING VARIABLE WIDTH CELLS OF HTML TABLE

FIELD OF THE INVENTION

The present invention pertains generally to web page design, and more particularly to a method for adaptively resizing web page banners to cover the entire width of the web page display window.

BACKGROUND OF THE INVENTION

The proliferation of the Internet and the World Wide Web, hereinafter "web", as a medium for individual communication and business marketing, has lead to significant growth in the number of active web sites over the last few years. A web site is a collection of related web pages, usually under common ownership. The pages in a web site are associated with one another, and made accessible from one or more pages in the web site, via hyperlinks (or simply "links"). A web site is typically arranged hierarchically in levels, as illustrated by conventional web site 100 in FIG. 1. Web site 100 is organized in some type of hierarchical arrangement to allow the user to accomplish a specific task. At the top level 110 of the hierarchy is a home page 112, (sometimes called a lodge page or an entry page), which informs the user of the functionality of the web site 100. On the next level 120 of the hierarchy are HyperText Markup Language (HTML) web pages 122, 124, 126 that operate to segregate the functionality of web site 100 into major sections. For example, if web site 100 is designed to provide user information about a particular product, the major sections may include a documentation section page 122 which links to specific areas of the documentation at lower levels 130, 140 in the hierarchy. These lower level pages 132, 134, 136, 142 may include instruction pages for installing 132, troubleshooting 134, etc., the product. The major section pages 122, 124, 126 may also include a configuration section page 124 that operates as a web-based interface to the product and allows the user to set up and modify the configuration of a remote product. Another major section page may include a remote front panel page 126 that also operates as a web-based interface to the product and allows the user to actually operate the instrument.

FIG. 2 is an illustrative embodiment of a page 200 of web site 100 displayed in web page frame 203 of Internet browser 201. Page 200 includes application banner 202, application navigation bar 204, application frame 206, and background 208. Application navigation bar 204 typically provides icons 240, 242, 244, 246, 248 which provide access to useful navigation tools such as search, view, etc. Application frame 206 is used for displaying the substantive content of the particular page being viewed. The substantive content of the page is customizable by the developer and hence may take on any number of various display formats. Web page designers typically include a graphical banner, shown in FIG. 2 as application banner 202 with graphical images 252, 254, to indicate identity, corporate identity, ownership, etc. A company or organization often uses the same banner repeatedly on each web page throughout its web site. The same banner may also be used throughout multiple web sites when those multiple web sites are owned by a common entity. For example, a company that provides a web site for each of its products typically will employ the same banner throughout each of its products' web sites for consistency, ease in development, and coherency in developing user recognition of the product in association with the company name and logo.

A banner generally includes one or more graphical elements (e.g., a company logo, the company name, etc.) over a background graphic. Web page banners are traditionally defined as a single graphical interchange format (GIF) image having a single horizontal width.

Most web pages are designed to be viewable on displays of low resolution and small display area. This allows the page to be viewed by the greatest number of possible user displays. In addition, for ease in readability, text is typically displayed in narrow columns. Thus, because the web page itself is designed for low resolution graphics or small area displays, single GIF image banners make sense since the application frame itself does not expand beyond the width of the banner.

Some web sites are designed to allow the user to expand the window to cover the entire display or to contract it to cover only a portion of the full display. When the window is contracted, the entire banner is typically viewable only in portions using a scrollbar. When the window is fully expanded, it fully expands only to the maximum width of the display it was designed for. Accordingly, a fully expanded web page on a high resolution or large area display does not cover the full expanse of the available display area if the web page was designed for a low resolution or small area display. Instead, its maximum width is fixed at the maximum width of the smaller display. Again, however, single GIF image banners work well as long as the application frame itself does not expand beyond the width of the banner. In certain applications, however, web pages are designed to take advantage of high resolution or larger area display screens. For example, a web page based application interface may require the ability to view multiple page elements at once, and therefore require a large display area and or very high resolution. As another example, the substantive content (e.g., detailed photographs or instrumentation snapshots) often require a high resolution display for proper viewing. If the web page graphics are designed to maximize the display area to optimize the available space for a high resolution display, the web page requires a larger application frame, and therefore an appropriately expanded banner to cover the width of the application frame.

Because banners are implemented as a single GIF image, to expand the banner to fit larger and/or higher resolution displays, the implementation technique requires a separate GIF banner image to be implemented with the appropriate fixed width for each targeted display type. The single GIF image banner cannot be scaled horizontally without altering the image unless it is simultaneously scaled vertically in the same proportion—in other words, the same aspect ratio (i.e., x:y relationship) must be maintained. However, altering the vertical scale is generally undesirable because to do so reduces the amount of display space that would otherwise be available for substantive web page content. Accordingly, a need exists for a method for supporting web pages (e.g., instrument snapshots that require a high resolution display for proper viewing, or interfaces that expand to fit the horizontal width of a high resolution display) that maximally expands to fit the width of the web page window regardless of the size or resolution of the user's display. Accordingly, it would be desirable to have a method to expand and contract a web page banner to fit the horizontal width of the window automatically without altering the size of the images embedded in the banner.

SUMMARY OF THE INVENTION

The present invention allows designers of web pages to design horizontal visual banner devices that can be reused for different window widths without requiring a separate banner for each width. The designer need only define the elements on the banner (e.g., product name, company logo) and then implement a HyperText Markup Language (HTML) table in accordance with the method of the invention to create a visual banner whose size matches the desired width.

In accordance with the method of the invention, web page banners are constructed in parts using HTML tables rather than as a single graphical image. The background image is defined in an HTML table. Each graphical image that in the prior art would normally be embedded within the single GIF image is separately overlaid, with a transparent background to allow the table background to remain visible, in a separate fixed-width cell of the table. Empty space regions are defined as transparent variable-width cells and appropriately positioned in the table. The user's browser automatically resizes the variable-width cells to adjust the width of the table to cover the width of the window that displays the web page.

In one embodiment, the banner is created using a HyperText Markup Language (HTML) table to allow designers to build visual banners that are sized automatically. The designer first creates the necessary graphical elements that will be presented in the visual banner (e.g., logo, ownership identity). Each of these graphical elements are stored as a GIF version 89a image with transparency enabled. The designer then creates an HTML table that has one fixed-width cell for each graphical element. The graphical elements are defined in relative positions in the table. The background color of all cells are set to the desired background color of the visual banner using standard HTML code. Then, whenever the user loads a page that includes the banner into their web browser, the browser itself determines the width of the display area and automatically adjusts the size of the table to fit the display area. The graphical elements, which were stored in GIF 89a format with transparent backgrounds, are displayed in the table cells and anchored to their relative positions in the table, with the background color surrounding them, resulting in the perception that the banner has been built specifically for the width of the display area.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

The invention is a method for generating graphical banners that appear appropriately and allow a web browser to automatically adjust the horizontal width of a banner to cover the horizontal expanse of a window regardless of the actual window dimensions.

Figure 1:
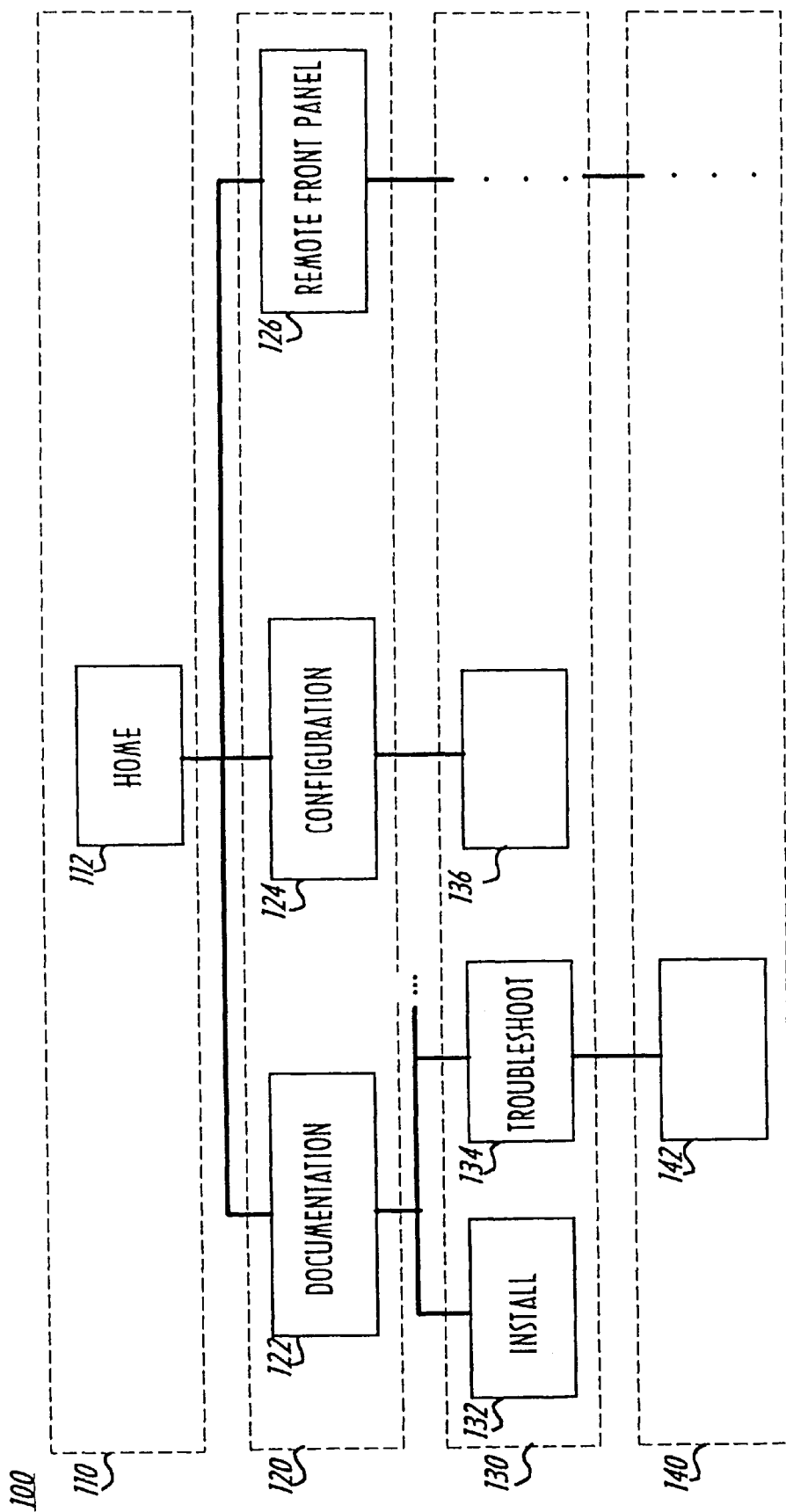
FIG. 1 is a block diagram of a web site.
Figure 2:
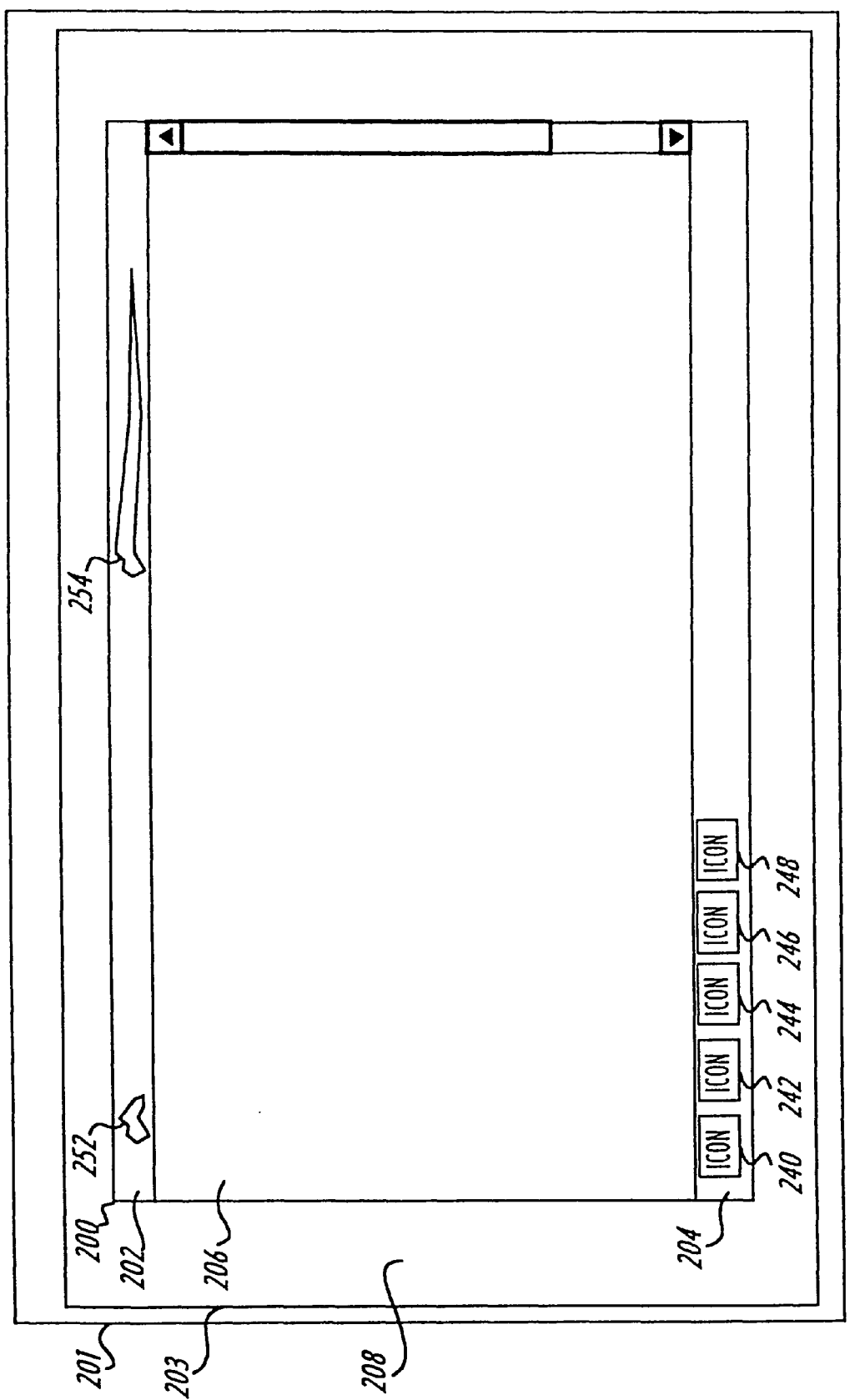
FIG. 2 is a diagram of one embodiment of an example web page.
Figure 3:
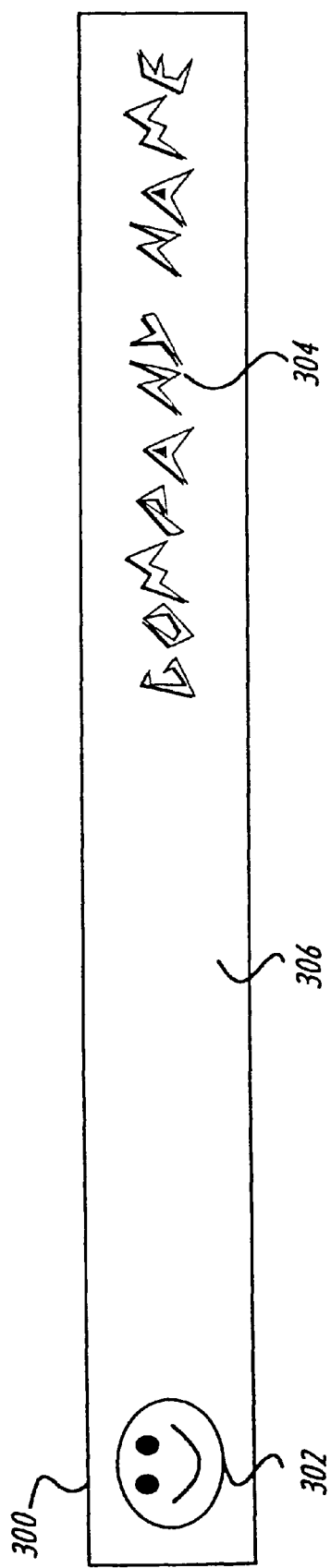
FIG. 3 is a diagram of a prior art single GIF image banner.

FIG. 3 is a diagram of a prior art banner 300 implemented as a single graphical interchange format (GIF) image. Banner 300 includes a logo 302 and site owner identifier 304 embedded in a background image 306 (typically a solid color). Because banner 300 is implemented as a single GIF image, in order to display the same banner to fill the horizontal width of different display widths, the developer of the web page must implement a separate GIF image banner for each window width. For example, if the web page is targeted for both a 300-pixel display and a 500-pixel display, the designer must implement both a 300-pixel GIF image banner and a 500-pixel FIG image banner despite the fact that the only difference may be in the width of space between the logo and owner identifier graphical elements. Furthermore, if the designer allows the user to adjust the size of the web page on the display, in order to display the banner as the full width of the window down to a minimum width threshold, a separate GIF image banner must be created for each possible width between the minimum threshold width and the maximum display width. This clearly requires unnecessary overhead in terms of required memory space and design time.

Figure 4:
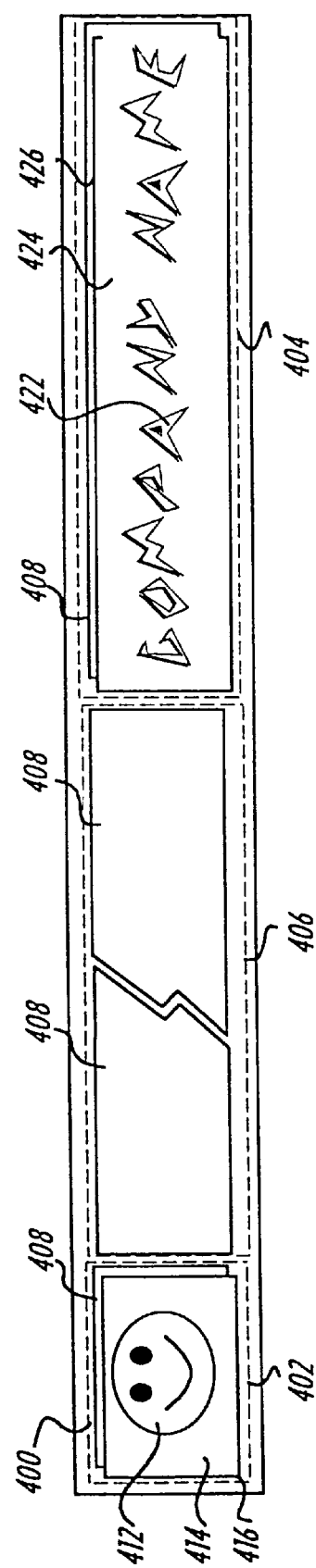
FIG. 4 is a diagram illustrating a banner implemented in accordance with the method of the invention.

FIG. 4 is a diagram of a banner 400 in accordance with the invention. Banner 400 is implemented as a table that includes both fixed- and variable-width cells. Each fixed-width cell has a pre-defined width. Variable-width cells have an adjustable width which is determined dynamically by the web browser.

In the illustrative embodiment, banner 400 is defined as an HTML table. Table 400 includes logo table cell 402, site owner identifier table cell 404, and variable-width cell 406.

A background image is embedded in the table across background layers 408 of each of cells 402, 404, 406. It is up to the designer to determine which parts of the background image may expand without changing the aspect ratio of the entirety of the background image, and which parts of the background image must remain of fixed width. Those portions of the background image that must remain a fixed width must be implemented in fixed-width cells. It will be appreciated by those skilled in the art that a complex image may be implemented as the background of a banner so long as at least a portion of the background image may be expanded in an acceptable manner to the designer. For ease of construction, the background image of the banner in the illustrative embodiment is implemented simply as a solid color. This allows the background layer 408 of each cell in table 400 to be specified simply by defining a default background color to the desired color.

Each graphical image in the banner, (i.e., the logo 412 and owner identifier 422 in the illustrative embodiment) is implemented as a GIF 89a format image with a transparent background that fits within a fixed width cell. Each pixel 414, 424 in the GIF image that is not part of the graphical image 412, 422 is set to be transparent. The GIF image 402, 404 is then overlaid as the foreground layer 416, 426 over the background layer 408 of its corresponding fixed-width cell. Since transparency is enabled for pixels 414, 424 that are not part of the graphical image 412, 424, the background image on the background layer 408 appears around the graphical image 412, 424 of the foreground layer 416, 426. In the illustrative embodiment, the logo is defined as a GIF 89a image 412 with transparency enabled for non-image pixels 414 and overlaid as the foreground layer 416 of fixed-width cell 402. Thus, fixed-width cell 402 appears to the user as the logo surrounded by the background color specified in background layer 408. Similarly, the owner identity 422 is defined as a GIF 89a image with transparency enabled for non-image pixels 424 and overlaid as the foreground layer 426 of fixed-width cell 404. Thus, fixed-width cell 404 appears to the user as the graphical owner identity image surrounded by the background color. Foreground images are not implemented for variable-width cells. Thus, variable-width cell 406 of table 400 does not have a foreground image, and only the background layer 408 of cell 406 appears to the user.

It will be appreciated by those skilled in the art that the number and placement of graphical images, and hence fixed-width cells, in a banner may vary from application to application, and that therefore the number of placement of variable-width cells surrounding and/or between each of the fixed-width cells will also vary according to the banner specifications. In addition, although in the illustrative embodiment the background image is a solid color, the number and placement of fixed-width cells implementing only the background image may also vary according to the complexity of the background image.

Table 1 illustrates sample HyperText Markup Language (HTML) code for implementing table 400.

TABLE 1

```
<html>
<head>
<title>Masthead Contents</title>
</head>
<body bgcolor="navy">
<table border=1 width=100%>
<tr valign=top>
    <td align=left>
<img src="logo.gif">
</td>
    <td align=right>
<img src="owner.gif">
</td>
</tr>
</table>
</body>
</html>
```

In this embodiment, the background layers 408 of each cell in table 400 are set to "navy" by setting the entire body of the table to navy via the HTML tag <body bgcolor="navy">. The width of the banner 400 is set to the width of the user's display (i.e., width=100%) via the HTML <table> tag. The table includes a single row since all cells are defined within the same HTML row <tr> tag, and is vertically aligned at the top of the page (i.e., "valign=top"). The graphical logo image 412 is defined via HTML <td> tag in a fixed-width cell by specifying a GIF image source file "logo.gif, and is anchored to the left-most position of the table. The graphical owner identity image 422 is defined via HTML <td> tag in a fixed-width cell by specifying a GIF image source file "owner.gif", and is anchored to the right-most position of the table. Because the fixed-width cells are anchored to particular relative positions in the banner width, the variable-width cell 406 need not be defined. The browser automatically expands the width of the table to fit 100% of the user display. Thus, since the fixed-width images are respectively anchored to the left and right of the table, the browser automatically adjusts the width of the portion of the table that is not covered by the fixed-width cells, and the banner appears as expanded to cover the full width of the user's display or web page window.

It will be appreciated by those skilled in the art that the invention described herein provides inherent advantages over the prior art. The automatic banner resizing allows a web site to have coherency among each web page in the site by incorporating the same banner across all web pages in the site. Additionally, all web sites developed by a common manufacturer, company, or organization can incorporate an identical banner without thought to the targeted users' display configuration. The same banner may be used regardless of the size of the web page used with it, or resolution or size of the user's display. The user's browser automatically resizes the banner according to the type, resolution, and configuration of the user's display independently and without intervention of the web site developer's code. Finally, the banner may be defined to adjust to expand to the size of the web page window rather than display resolution, and accordingly, may be used to automatically adjust in width as the user adjusts the web page window.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A system for generating a web page banner for a web page, said web page displayable in a window on a user's display via an internet browser, said banner comprising:

a table comprising a plurality of cells, said plurality of cells comprising a fixed-width cell having a fixed width and a variable-width cell having an adjustable width, said fixed-width cell and said variable-width cell aligned horizontally;

a background image embedded across said plurality of cells, a first portion of said background image being embedded in said fixed-width cell and a second portion of said background image being embedded in said variable-width cell;

a foreground image with a transparent background overlaid over said first portion of said background image in said fixed-width cell such that said first portion of said background image appears through said transparent background of said foreground image in said fixed-width cell; and wherein said internet browser adjusts said adjustable width of said variable-width cell such that the width of said table matches the width of said window.

2. A banner in accordance with claim 1, wherein:

said background image comprises a solid background color.

3. A banner in accordance with claim 1, wherein:

said foreground image comprises a graphical interchange format (GIF) 89a image with transparency enabled.

4. A banner in accordance with claim 1, wherein:

said table is implemented using HyperText Markup Language (HTML) code.

5. A banner in accordance with claim 1, wherein:

said plurality of cells comprises at least one additional fixed-width cell having a corresponding fixed width;

wherein each of said fixed-width cell and said at least one additional fixed-width cell are relatively positioned within said table such that when said internet browser adjusts said variable-width cell, each of said fixed-width cell and said at least one additional fixed-width cell maintain their relative position in said table with respect to said width of said table.

6. A banner in accordance with claim 5, wherein:

said plurality of cells comprises at least one additional variable-width cell, having an adjustable width and said internet browser adjusting said corresponding adjustable width of said at least one additional variable-width cell to maintain said relative position of said fixed-width cell and said at least one additional fixed-width cell in said row with respect to said width of said window.

7. A banner in accordance with claim 6, wherein:

said table is implemented using HyperText Markup Language (HTML) code.

8. A banner in accordance with claim 1, wherein:

said fixed-width cell is relatively positioned within said table; and said plurality of cells in said table comprise at least one additional variable-width cell, said at least one additional variable-width cell having an adjustable width and said internet browser adjusting said adjustable width of said variable-width cell and of said at least one additional variable-width cell to maintain said relative position of said fixed-width cell in said table with respect to said horizontal width of said window.

9. A banner in accordance with claim 8, wherein:

said table is implemented using HyperText Markup Language (HTML) code.

10. A method for generating an adjustable web page banner for a web page, said adjustable web page banner having a horizontal width of a web page banner that is adjustable by a user's internet browser to match a horizontal window width of a window displaying said web page, said method comprising:

defining a table comprising a plurality of cells to have a horizontal table width that matches said horizontal window width, said plurality of cells comprising a fixed-width cell having a fixed width and a variable-width cell having an adjustable width;

embedding a background image across said plurality of cells of said table;

embedding a first portion of said background image in said fixed-width cell and embedding a second portion of said background image in said variable-width cell;

overlaying a foreground image comprising a graphical image with a transparent background over said background image in said fixed-width cell; and wherein said internet browser adjusts said adjustable width of said variable-width cell such that said horizontal table width matches said horizontal window width.

11. A method in accordance with claim 10, comprising:

defining said background image as a solid background color.

12. A method in accordance with claim 10, comprising:

implementing said foreground image as a graphical interchange format (GIF) 89a image with transparency enabled.

13. A method in accordance with claim 10, comprising:

defining said plurality of cells in said table to comprise at least one additional fixed-width cell having a corresponding fixed width and aligned horizontally with said fixed-width cell and said variable width cell;

positioning each of said fixed-width cell and said at least one additional fixed-width cell relative to one another within said table such that when said internet browser adjusts said variable-width cell, each of said fixed-width cell and said at least one additional fixed-width cell maintain their relative position in said table with respect to said horizontal width of said window.

14. A method in accordance with claim 13, comprising:

defining said plurality of cells in said table to comprise at least one additional variable-width cell having a corresponding adjustable width;

wherein said internet browser adjusts said corresponding adjustable width of said at least one additional variable-width cell to maintain said relative position of said fixed-width cell and said at least one additional fixed-width cell in said table.

15. A method in accordance with claim 10, comprising:

positioning said fixed-width cell in a relative position within said row; and defining said plurality of cells in said table to comprise at least one additional variable-width cell having a corresponding adjustable width;

wherein said internet browser adjusts said corresponding adjustable width of said variable-width cell and said at least one additional variable-width cell to maintain said relative position of said fixed-width cell in said table with respect to said horizontal width of said window.

* * * * *